United States Patent [19] [11] 3,928,805
MacTaggart [45] Dec. 23, 1975

[54] DETECTABILITY OF EMERGENCY BEACON

[75] Inventor: Donald MacTaggart, Montreal, Canada

[73] Assignee: Canadian Marconi Company, Montreal, Canada

[22] Filed: Sept. 20, 1973

[21] Appl. No.: 399,069

[52] U.S. Cl. .................. 325/65; 325/141; 325/152; 325/186; 329/105; 340/258 B
[51] Int. Cl.$^2$ .................. H04B 1/10
[58] Field of Search ............ 325/42, 43, 44, 64, 65, 325/141, 144, 152, 153, 182, 323, 473, 325, 28, 29, 31; 329/50, 100, 105; 332/10; 343/100 CL, 100 ME, 100 CS, 101–103, 105 R, 105 H, 112 D, 5 PD; 178/68; 340/224, 258 B, 258 D

[56] References Cited

UNITED STATES PATENTS

| | | | |
|---|---|---|---|
| 2,658,993 | 11/1953 | Seely | 325/141 |
| 3,207,850 | 9/1965 | Foreman | 179/5 |
| 3,412,334 | 11/1968 | Whitaker | 325/325 |

OTHER PUBLICATIONS

"Correlation Devices"–Harold R. Raemer, Allen B. Reich–"Electronics"–May 22, 1959, pp. 58–60.

*Primary Examiner*—Benedict V. Safourek
*Assistant Examiner*—Marc E. Bookbinder
*Attorney, Agent, or Firm*—Alan Swabey; Robert E. Mitchell

[57] ABSTRACT

This invention relates to a method for increasing the range of detectability of an emergency locator transmitter beacon, and for conserving transmitter power of the emergency locator transmitter, and to a transmitter and receiver for carrying out the method. In accordance with the invention, the carrier of the transmitter is amplitude modulated with a rectangular waveform whose frequency is a precise submultiple of the carrier frequency. A receiver for the system cross-correlates a received input with a reference signal which is a replica of the modulating waveform. The cross-correlator output indicates whether the received signal is identical to the reference signal, i.e., was transmitted by the transmitter. The reason for making the modulating signal a precise submultiple of the carrier frequency is that, for a correlator to work, the frequency of the correlated waves must be precise. As the carrier frequency of the transmitter is crystal controlled, it is most convenient to take off a submultiple of this frequency to control the modulator precisely. With a system in accordance with the invention, the signal to noise ratio is enhanced to thereby increase the range of detectability. At the same time, the transmitter is turned off cyclically so that transmitter power is conserved.

1 Claim, 4 Drawing Figures

DETECTABILITY OF EMERGENCY BEACON

BACKGROUND OF THE INVENTION

1. Field of the Invention

This invention relates to a method for increasing the range of detectability of an Emergency Locator Transmitter (ELT) beacon and for conserving transmitter power of the ELT.

The invention also relates to modifications of ELTs, and receivers used in association with the transmitters, for carrying out the method. More specifically, this invention relates to an ELT wherein the carrier of the transmitter is amplitude modulated by a rectangular wave whose frequency is a precise submultiple of the accurately controlled carrier frequency of the transmitter, and to a receiver for use in association with such an ELT which is adapted to cross-correlate a received signal with a reference signal identical to the modulating signal of the ELT.

2. Description of the Prior Art

Presently available ELTs (as, for example, SARAH transmitters) normally transmit an unmodulated carrier at the International distress frequency of 243 MHz or submultiples thereof. Some ELTs are designed to automatically switch ON and OFF for set amounts of time in order to conserve power. Applicant is not aware of any ELT provided with a modulation scheme for increasing the range of detectability of the beacon thereof and for conserving transmitter power.

Although it is known in the prior art to use cross-correlation techniques for measuring range, applicant is not aware of the use of such techniques to increase the range of detectability of a transmitter by employing the techniques to determine the presence or absence of a specific waveform.

SUMMARY OF THE INVENTION

In accordance with the invention, a method for increasing the range of detectability of an ELT beacon, and for conserving transmitter power of the ELT, said ELT comprising means for generating a carrier waveform at an accurately controlled frequency, which method comprises; amplitude modulating said carrier waveform with a modulating rectangular waveform, at a modulating frequency which is a precise submultiple of the carrier frequency; and receiving said signal in a receiver means; said receiver means comprising a reference signal source whose output is identical to said modulating rectangular waveform; said receiver means further comprising cross-correlation circuitry; said method further comprising cross-correlating a received signal with said output of said reference signal source to thereby determine whether said received signal is identical with said output of said reference signal source.

An ELT for use in carrying out the method comprises; oscillator means for producing a carrier waveform at an accurately controlled carrier frequency; means for generating a rectangular wave at a second frequency for amplitude modulating said carrier signal; characterized in that said second frequency is a precise submultiple of said carrier frequency.

BRIEF DESCRIPTION OF THE DRAWINGS

The invention will be better understood by an examination of the following description, together with the accompanying drawings, in which.

DETAILED DESCRIPTION OF THE DRAWINGS

For a correlator to work, the frequency of the modulating waveform must be precise. As the carrier frequency of an ELT is accurately controlled, it is convenient to take the modulating frequency off the carrier frequency multiplier chain. This is the principle employed in the transmitter illustrated in FIG. 1.

Figure 1:
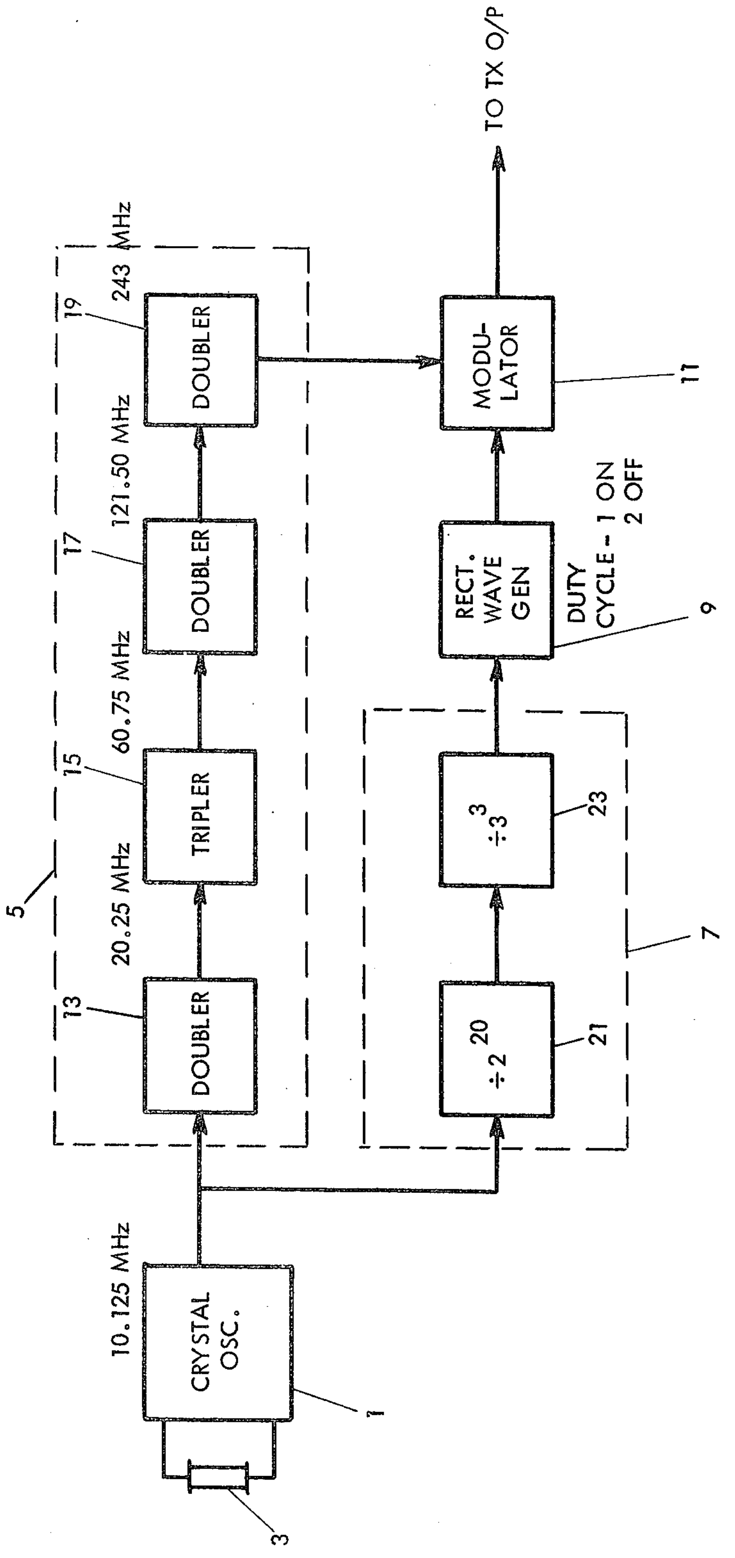
FIG. 1 is a block diagram of a transmitter in accordance with the invention.

Referring to FIG. 1, 1 is a crystal oscillator driven by piezo-electric crystal or like means 3. The output of the crystal oscillator drives a frequency multiplication chain 5 as well as a frequency dividing chain 7. The output of the frequency multiplier is a signal at 243 MHz (or submultiples of 243 MHz).

The divider chain 7 divides the crystal frequency down to a convenient frequency for utilization, and the output of the divider chain controls the frequency of rectangular wave generator 9. Modulator 11 is fed, at one input thereof, from the multiplier chain 5 and, at the other thereof, from the rectangular wave generator. It can be seen that the modulating waveform frequency will be a precise submultiple of the carrier frequency.

The modulator is fed to the output of the transmitter as is well known in the art.

In the embodiment illustrated in FIG. 1, the multiplier chain consists of a doubler 13 followed by a tripler 15 followed by two further doublers 17 and 19. The divider chain consists of a divide by $2^{20}$ unit 21 followed by a divide by $3^3$ unit 23. With the arrangement shown in FIG. 1, the rectangular wave generator will be driven by a frequency of 0.357729288734375 Hz. However, this frequency is not necessary, and other modulating frequencies could be used just so long as they are precise submultiples of the carrier frequency. Thus, it is possible to use a repetition rate of 1 sec ON 2 sec OFF.

It will also be clear that the particular arrangement of doublers and triplers in the multiplication chain as shown in FIG. 1 is merely one suitable arrangement for producing the carrier frequency. Obviously, other arrangements could be used instead of the one shown.

Figure 2:
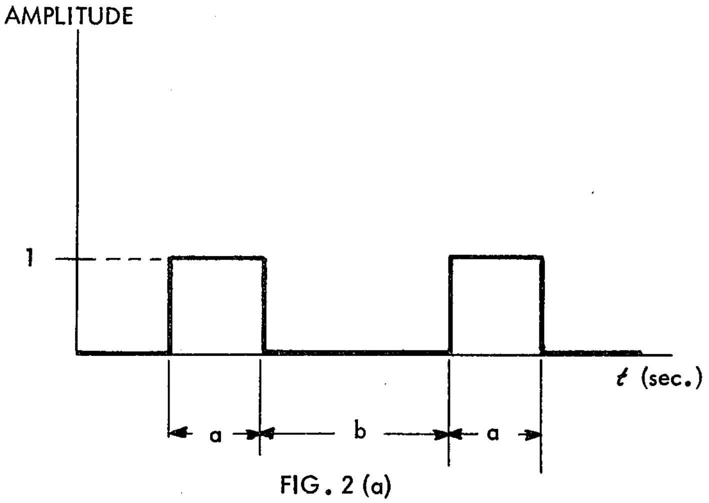
FIG. 2*a* and FIG. 2*b* are graphs useful in explaining the operation of a receiver for use with a transmitter in accordance with the invention.
Figure 2:
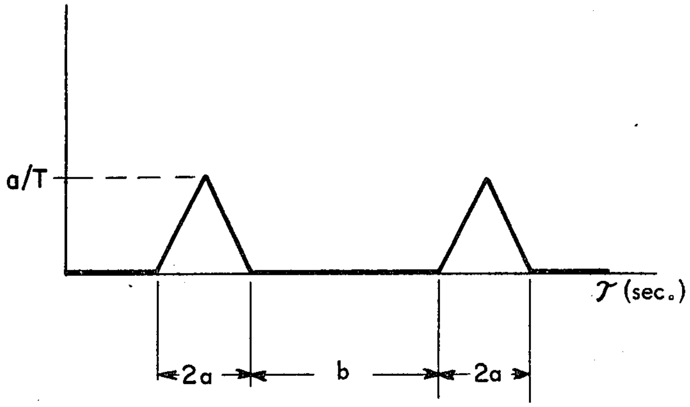

Referring now to FIG. 2, it is well known that the correlation function R($\tau$) of the correlation between two waveforms $x(t)$ and $y(t+\tau)$ is given by the expression $$R(\tau) = \frac{1}{T} \int_{o}^{T} x(t)\, y(t+\tau) dt$$

where $\tau$ is the phase between the waveforms and T is a time variable related to the period of both waveforms. When $x(t)$ and $y(t)$ are identically shaped square waves, R($\tau$) is a triangular wave having a period equal to the period of the square wave.

FIG. 2(*b*) illustrates the correlation function of a rectangular waveform, shown in FIG. 2(*a*), wherein each pulse has a duration *a* and the spacing between pulses is *b*. As seen in FIG. 2(*b*), the correlation function is a triangular waveform wherein each triangle has a duration $2a$ and the spacing between triangles is equal to $b$.

Thus, to detect the presence of a signal transmitted by an ELT modulated as above described, a receiver will cross-correlate a received signal with a reference signal which is identical with the ELT modulating signal. When the received signal is identical with the reference signal, the output of the cross-correlator will produce an output which can drive a utilization means such as a CRT for visual indication, or other convenient indication means.

Figure 3:
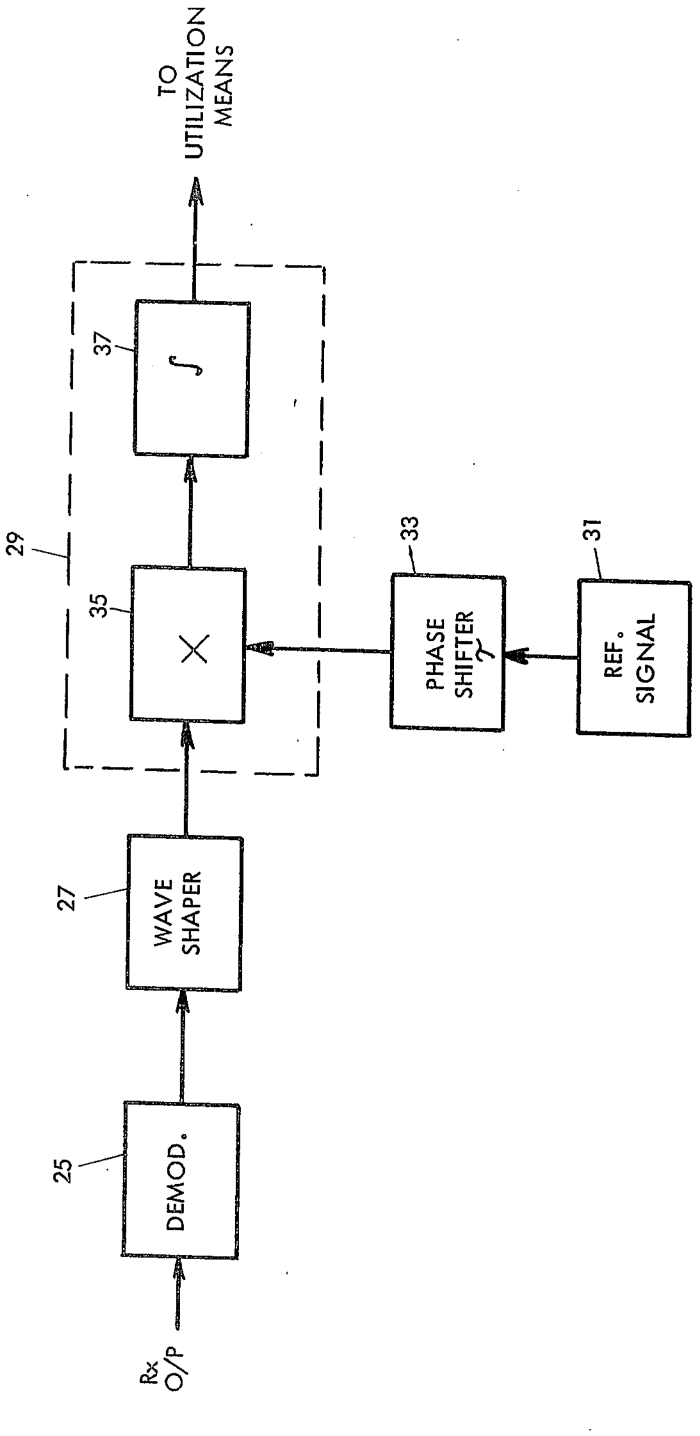
FIG. 3 is a block diagram explaining the underlying principles of receivers for use in accordance with the invention.

A block diagram for such a receiver is shown in FIG. 3. In FIG. 3, a demodulator 25 has its input connected to the RF output of the receiver. The output of the demodulator is fed to a waveshaper 27 and the output of the wave shaper is fed to one input of the cross-correlator 29.

Output from reference signal source 31 is fed, via phase shifter 33, to the other input of the cross-correlator. The output of the cross-correlator is fed to a utilization means not shown.

The cross-correlator consists of a multiplier means 35 and an integrator means 37, both such means and the circuitry thereof being well known in the art.

With a system as above-described, when the receiver receives a signal which was transmitted by the transmitter, i.e., a signal which is identical with the reference signal in the receiver, then, as we increase the length of the sample, the strength of the attendant noise will increase linearly, but the signal strength will be squared. In contradistinction, in non-correlating receivers, the noise increases at the same rate as the signal. The reason for the difference with the correlating receiver is that, while the noise is incoherent, the signal is coherent with the reference signal by which it is multiplied.

As will be apparent, the length of the sample is increased by increasing the number of cycles of integration in the correlator.

Because of this relatively larger increase in signal vs noise, the signal to noise ratio (SNR) is enhanced. The degree to which the SNR is enhanced is a function of the length of the sample.

Now, in an environment containing a given level of noise, a given level of signal transmitted from a CW receiver will be detected by a receiver only when it is within a given range of the transmitter. The given range is a function of the SNR. As the SNR is enhanced with the inventive system, the outer limits of the range at which a signal is detected is, of course, increased, even though the level of the transmitted signal is unaltered.

As will be apparent a penalty is incurred with the inventive system. Specifically, the penalty of requiring larger periods of time for more cycles of integration in order to increase the enhancement of the SNR.

As mentioned above, the range of detectability is increased with the inventive system even though the transmitted level is unaltered. However, it is noted that, with the inventive system, the transmitter is OFF for specific periods of time, e.g., OFF two-thirds of the time in the example given above. Thus, the inventive system does not require as much power to drive the transmitter even when the range of detectability is increased so that transmitter power is conserved with the inventive system. The amount of power conserved is a function of the duty cycle of the transmitter.

Although only one embodiment has been described in the foregoing, it is to be understood that this was for the purpose of illustrating, but not limiting the invention. Many modifications which will come readily to the mind of one skilled in the art are considered to be within the scope of the invention as defined in the appended claims.

I claim:

1. A method for increasing the range of an emergency locator radio transmitter beacon and for conserving transmitter power of the transmitter;

said method comprising;

amplitude modulating a carrier waveform, having a frequency which is accurately controlled by a crystal oscillator, of the transmitter with a modulating rectangular waveform at a modulating frequency which is a precise submultiple of the accurately controlled carrier waveform frequency;

transmitting the modulated waveform by radio waves;

receiving said transmitted signal in a receiver means;

demodulating said received signal;

and cross-correlating said demodulated signal with the output of a reference signal source in said receiver means to thereby determine whether said demodulated signal is identical with said output, of said reference signal source;

providing an indication signal when said demodulated signal is identical with said output of said reference signal source;

characterized in that the transmitter is cyclically turned on and off to preserve power.

* * * * *